United States Patent [19]
Tanaka

[11] Patent Number: 6,078,725
[45] Date of Patent: Jun. 20, 2000

[54] APPARATUS FOR A SYNCHRONIZED PLAYBACK OF AUDIO-VIDEO SIGNALS

[75] Inventor: Mitsumasa Tanaka, Tokyo, Japan

[73] Assignee: NEC Corporation, Tokyo, Japan

[21] Appl. No.: 09/003,754

[22] Filed: Jan. 7, 1998

[30] Foreign Application Priority Data

Jan. 9, 1997 [JP] Japan .................................. 9-001922

[51] Int. Cl.[7] .................................................. H04N 5/76
[52] U.S. Cl. ........................ 386/100; 386/104; 386/112; 348/515
[58] Field of Search ................................ 348/515, 518, 348/423, 845; 386/54, 100, 101, 104, 109–112

[56] References Cited

U.S. PATENT DOCUMENTS

| | | | |
|---|---|---|---|
| 5,289,276 | 2/1994 | Siracusa et al. | 348/467 |
| 5,508,816 | 4/1996 | Ueda et al. | 358/341 |
| 5,533,021 | 7/1996 | Branstad et al. | 348/518 |
| 5,596,420 | 1/1997 | Daum | 386/110 |
| 5,661,728 | 8/1997 | Finotello et al. | 348/515 |
| 5,677,980 | 10/1997 | Naoe | 386/112 |
| 5,784,527 | 2/1998 | Ort | 386/111 |
| 5,808,722 | 9/1998 | Suzuki | 348/515 |
| 5,895,123 | 4/1999 | Fujii et al. | 386/104 |

FOREIGN PATENT DOCUMENTS

| | | |
|---|---|---|
| 6-165075 | 6/1994 | Japan . |
| 6-233269 | 8/1994 | Japan . |
| 8-140054 | 5/1996 | Japan . |
| 8-140089 | 5/1996 | Japan . |
| 8-251543 | 9/1996 | Japan . |

*Primary Examiner*—Victor R. Kostak
*Attorney, Agent, or Firm*—Foley & Lardner

[57] ABSTRACT

To provide an apparatus for a synchronized playback of com- pressed digital data of audio-video signals adequately even when there are data errors with a simple configuration to be applied to a system having comparatively low data processing ability, independent of resolution of a software timer of the system, the apparatus obtains a reference time indicating production time passage of the audio signal component from reproduced data amount added with rejected error data amount of the audio signal component, and detects progress of the video signal component in reference to the reference time considering rejected error video data amount.

6 Claims, 5 Drawing Sheets

APPARATUS FOR A SYNCHRONIZED PLAYBACK OF AUDIO-VIDEO SIGNALS

BACKGROUND OF THE INVENTION

The present invention relates to an apparatus for synchronized playback of audio-video (hereafter abbreviated as AV) signals, wherein compressed digital data of AV signals are decompressed into a video signal component and an audio signal component to be represented in synchronization with each other.

In the synchronized playback of AV signals, compressed digital data of AV signals read out from recording media such as a CD-ROM (Compact Disk Read Only Memory) or a hard disk device are decompressed before being represented through output devices such as a CRT monitor and a speaker. When the apparatus for the synchronized playback is provided with data processing ability sufficiently high for the data decompression of the AV signals, or when video signal size of the compressed digital data is comparatively small, the data decompression of both of the video signal component and the audio signal component can be performed within a short time, and so, audio data and video frames can be reproduced without interruption.

However, when the data processing ability of the apparatus is not sufficiently high compared to the video signal size of the compressed digital data, the apparatus can not reproduce both the audio signal component and the video signal component in real time with which they are recorded originally, taking too much time for the data decompression processes. In consequence, the video signal component may be represented as a slow-motion film and the audio signal component is reproduced intermittently.

The intermittent reproduction of the audio signal component gives sense of intense incongruity to the human hearing. Therefore, the audio signal component is usually processed to be reproduced continuously with a priority over the video signal component. The data decompression and displaying process of the video signal component is performed when the audio signal component is not processed. Here, adequate thin down of the picture frames (so-called frame omission) becomes necessary for synchronizing the presentation timings of the audio signal component and the video signal component so that the video signal component may not be delayed from the audio signal component.

As for the digital data compression, there is known an MPEG (Motion Picture Experts Group) standard, wherein the audio signal component and the video signal component separated of the AV signals are compressed independently into two data streams, an audio data stream and a video data stream.

FIG. 2A and FIG. 2B are schematic diagrams illustrating the video data stream 201 and the audio data stream 202, respectively. The video data stream 201 consists of a succession of GOP (Group Of Pictures) each composed of compressed data of picture frames, each denoted by a symbol I (Intra picture), B (Bidirectionlly predictive picture) or P (Predictive picture), while the audio data stream 202 consists of a succession of AAU (Audio Access Units) each including header information, error check bits, audio data and ancillary data. The video data stream 201 and the audio data stream 202 are multiplexed into a system stream at proper intervals, added with timing information called time stamps, so as to enable synchronized playback of the AV signals referring thereto.

As a prior art technique of the synchronized playback of the audio signal component and the video signal component from such multiplexed data, there is, for example, a Japanese patent application laid open as a Provisional Publication No. 140054/'96 (hereafter called the first prior art apparatus).

In the first prior art apparatus, vertical blanking intervals in a display signal are increased or decreased referring to the time stamps when the display signal is generated form data prepared in a video frame buffer so that representation timing difference between the audio signal component and the video signal component may not become more than a predetermined threshold value.

In another Japanese patent application laid open as a Provisional Publication No. 233269/'94 (hereafter called the second prior art apparatus), a video data unit of certain number of picture frames and corresponding amount of audio data unit are decompressed in parallel, unit by unit, and time difference between completion timings of decompression of the video data unit and the audio data unit is counted for every unit. Referring to the time difference, synchronization of the audio data and the video data is performed by increasing or decreasing display time of next picture frame, or by displaying the same picture frame repeatedly or omitting reproduction of following picture frames.

There are also Japanese parent applications laid open as Provisional Publication No. 165075/'94 and No. 140089/'96 (hereafter called the third prior apparatus). In the third prior apparatus, when a data error owing to data transmission error, for example, is detected in data receiving or data processing, the audio signal is muted in synchronization with the reproduction timing of the error data, for preventing jarring noises to be reproduced.

However, there are problems in these prior apparatus.

In the first prior apparatus, display timing of each picture frame is adjusted referring to difference of time stamp information of the audio data and video data. However, when the apparatus has not sufficient data processing ability, even if the vertical blanking interval is decreased, video data decompression delay itself cannot be recovered.

In the second prior apparatus, timing difference between decompression completion of the audio data unit and the video data unit is measured. Therefore, if there are some data errors in either or both the audio data and the video data, appropriate synchronization cannot be performed.

Furthermore, when the playback apparatus is implemented with software operating on an operating system with a low resolution software timer, there is another problem that correct synchronization between the audio signal component and the video signal component cannot be obtained because of the low resolution of the software timer, when the timing difference between decompression completion of the audio data unit and the video data unit is measured by the software timer. A fine resolution of a hardware timer, a CPU clock, for example, can be used, of course. However, use of the hardware timer makes the apparatus hardware-dependent, not applicable but to computers having a specific CPU clock hertz.

In the third prior apparatus, muting of the audio signal is performed when a data error is found. However, there is no description concerning the video signal reproduction or the synchronization of the audio signal component and the video signal component against the data error.

SUMMARY OF THE INVENTION

Therefore, a primary object of the present invention is to provide an apparatus for a synchronized playback of audio-video signals with a simple configuration to be applied to a system having comparatively low data processing ability such as a personal computer, wherein the video signal component can be decompressed and reproduced in synchronization with the audio signal component adequately even when there is found a data error in the audio data stream or the video data stream.

In order to achieve the object, an apparatus for synchronized playback of audio-video signals of the invention, for representing an audio signal component and a video signal component in synchronization with each other by decompressing compressed digital data of the audio signal component and the video signal component, comprises;

means for obtaining a reference time indicating reproduction time passage of the audio signal component from reproduced data amount of the audio signal component added with an error data amount of the audio signal component rejected because of a data error, referring to header information of the compressed digital data which includes a sampling rate of the audio signal component and a frame rate of the video signal component;

a video frame counter for counting and maintaining a real frame number by accumulating a number of picture frames actually decompressed and a number of picture frames omitted to be decompressed;

a video error detector for adding an error frame number of the video signal component rejected without reproduction because of a data error to the real frame number, a delay detector for calculating an ideal frame number of the video signal component to be displayed originally from the reference time and the frame rate, and detecting the progress of the video signal component by comparing the real frame number to the ideal frame number, and means for restoring difference of display timing of the video signal component from the reference time by performing frame omission and decompression waiting of the video signal component according to the progress of the video signal component.

Therefore, the video signal component can be decompressed and reproduced in synchronization with the audio signal component from the compressed digital data adequately even when there are found error data in either or both of the audio signal component and the video signal component with a simple configuration, according to the data processing ability of a system wherein the apparatus of the invention is applied, independent of resolution of the software timer of the system, without needing any special hardware timer.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Figure 2A:
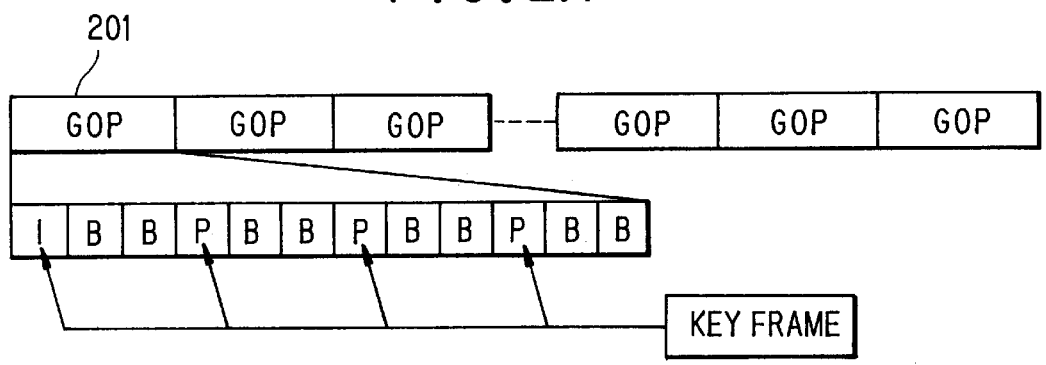
FIG. 2A is a schematic diagram illustrating a video data stream 201.
Figure 2B:
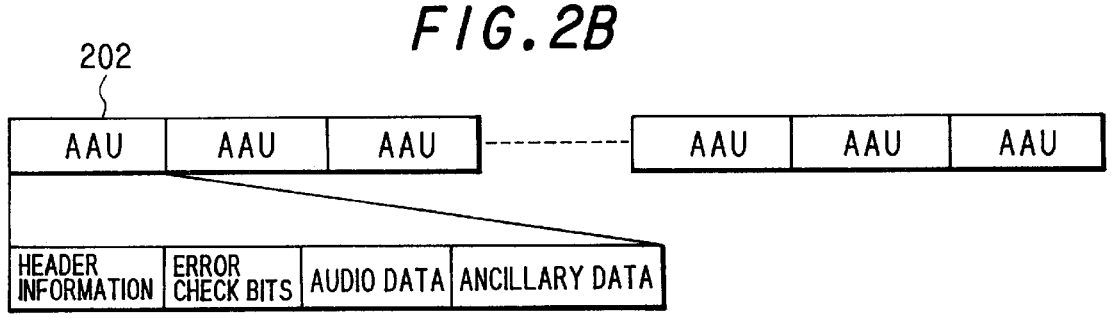
FIG. 2B is a schematic diagram illustrating an audio data stream 202.

The apparatus of the invention reproduces AV signals from compressed data, such as the MPEG data illustrated in FIGS. 2A and 2B, multiplexed of the video data stream 201 consisting of GOPs and the audio data stream 202 consisting of AAUs. A GOP has a set of picture frames and an AAU has header information of 32 bits, error check bits of 16 bits (optional), audio data and ancillary data. Beginning 12 bits of the header information are called SW (Synchronous Word), which are all at logic '1' and used for detecting beginning of each AAU.

Now, embodiments of the present invention will be described in connection with the drawings.

Figure 1:
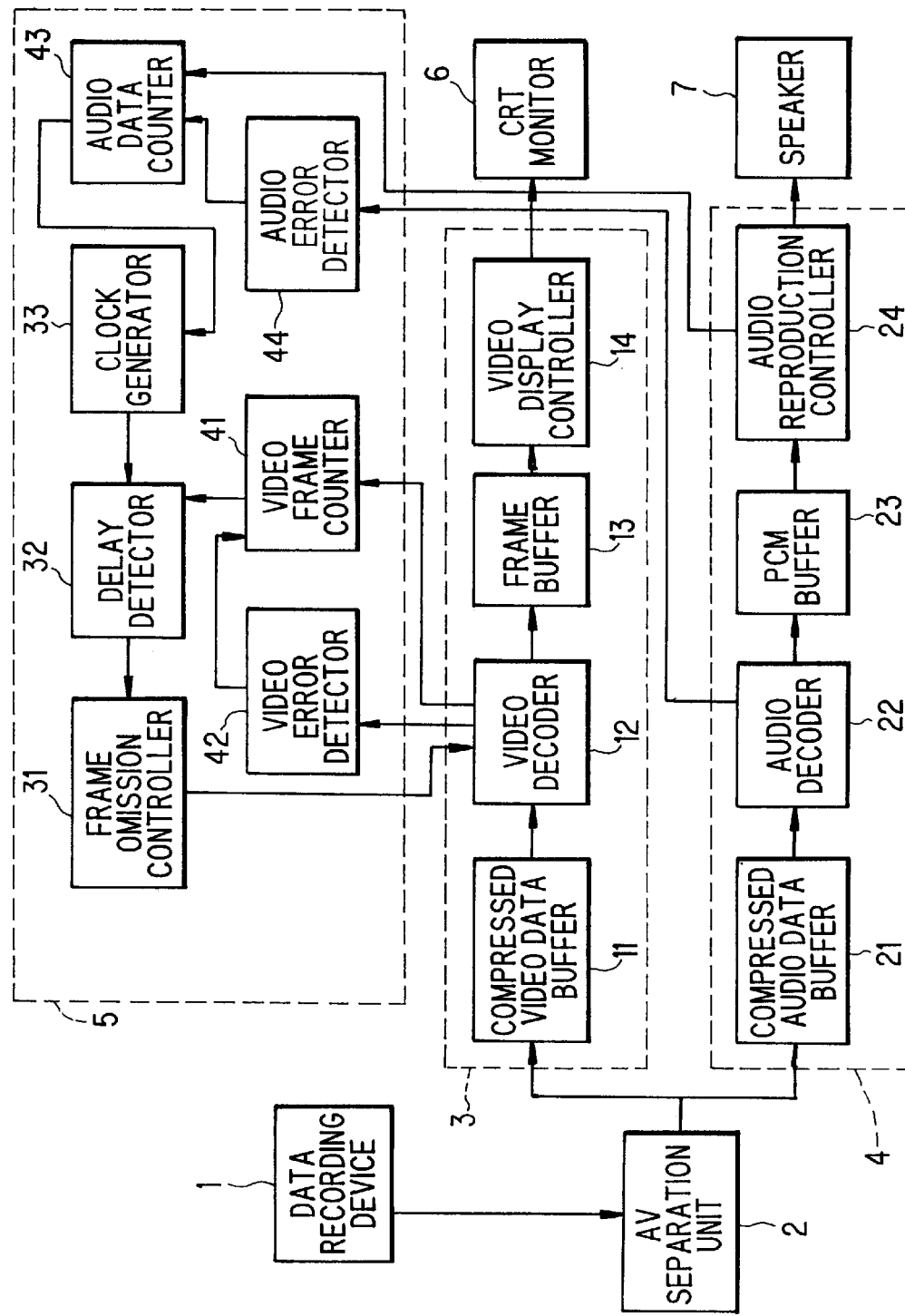
FIG. 1 is a block diagram illustrating a fundamental configuration of an apparatus for a synchronized playback of audio-video signals according to an embodiment of the invention.

FIG. 1 is a block diagram illustrating a fundamental configuration of an apparatus for a synchronized playback of AV signals according to an embodiment of the invention.

Referring to FIG. 1, the apparatus comprises;

a data recording device 1 for storing compressed digital data of AV signals, an AV separation unit 2 for extracting an audio signal component and a video signal component multiplexed in the compressed digital data read out of the data recording device 1, a video signal processor 3 for performing decompression of the video signal component extracted by the AV separation unit 2, an audio signal processor 4 for performing decompression of the audio signal component extracted by the AV separation unit 2, an AV synchronization controller 5 for performing synchronization control between the audio signal component and the video signal component, a CRT monitor 6 for displaying the video signal component, and a speaker 7 for reproducing the audio signal component.

The video signal processor 3 includes;

a compressed video data buffer 11 for storing compressed data of the video signal component extracted by the AV separation unit 2, a video decoder 12 for decompressing the compressed data of the video signal component buffered in the compressed video data buffer 11 by analyzing attribute information (video header information) thereof, a frame buffer 13 for buffering frame data of the video signal component decompressed by the video decoder 12, and a video display controller 14 for generating display signals to be supplied to the CRT monitor 6 by reading out the frame data prepared in the frame buffer 13 in synchronization with synchronous signals for the CRT monitor 6.

The audio signal processor 4 includes;

a compressed audio data buffer 21 for storing compressed data of the audio signal component extracted by the AV separation unit 2, an audio decoder 22 for decompressing the compressed data of the audio signal component buffered in the compressed audio data buffer 21 by analyzing attribute information (audio header information) thereof, a PCM buffer 23 for storing data of the audio signal component decompressed by the audio decoder 22, and an audio reproduction controller 24 for generating sound signals to be supplied to the speaker 7 according to the data of the audio signal component supplied from the PCM buffer 23.

The AV synchronization controller 5 includes;

a video frame counter 41 for counting and maintaining a real frame number of the video signal component which indicates a sum of a frame number actually decompressed and a frame number omitted to be decompressed by the video decoder 12, from the beginning of reproduction, a video error detector 42 for counting a frame number of error video data which are rejected by the video decoder 12 without performing decompression because of error data found therein, an audio error detector 44 for counting data amount of error audio data which are rejected by the audio decoder 22 without performing decompression because of error data found therein, an audio data counter 43 for counting and maintaining data amount of the audio signal component actually decompressed and reproduced by the audio reproduction controller 24 from the beginning of reproduction, and those rejected by the audio decoder 22 because of data error, according to reproduction information supplied from the audio reproduction controller 24 and the rejected data amount counted by the audio error detector 44, a clock generator 33 for calculating a reference time indicating reproduction time passage of the audio signal component from the data amount counted by the audio data counter 43 referring to the audio header information analyzed by the audio decoder 22, a delay detector 32 for calculating an ideal frame number of the video signal component to be displayed originally from the reference time calculated by the clock generator 33 referring to the video header information analyzed by the video decoder 12, and detecting lead or lag of the video signal component to the audio signal component by comparing the ideal frame number to the real frame number counted by the video frame counter 41, and a frame omission controller 31 for performing frame omission when the video signal component is delayed from the audio signal component and decompression waiting when the video signal component is leading according to the lead or lag detected by the delay detector 32 referring to priority of frames to be decompressed.

Here, the frame omission is performed according to the order of priority of frames as will be described in the following paragraphs, and the decompression waiting is performed when a lead of the video signal component is detected by the delay detector 32 until the audio signal component overtakes the video signal component.

Now, the order of priority of frames is described.

As illustrated in FIG. 2A, frame data in each GOP of the video signal component are ranged according to an inter-frame prediction coding system such as the MPEG standard.

Referring to FIG. 2A, each GOP has a frame composition having data of I (Intra), P (Predictive) and B (Bidirectionally predictive) pictures. The I-picture, coded from intra-frame data, can be decompressed independently from itself without any key frame, and is used as a key frame to be referred to when following frames are decompressed. The P-picture, coded according to forward prediction, is decompressed referring to a preceding key frame. The P-picture is also used as a key frame to be referred to when following and preceding frames are decompressed. The B-picture, coded according to bi-directional prediction, is decompressed referring to a preceding key frame and a following key frame, being referred to by no other frame.

The key frame is a picture to be referred to when other pictures are decompressed, and so, when a key frame is omitted to be decompressed, following P and B-pictures until a next I-picture appears should be also omitted, unable to be decompressed.

Therefore, the frame omission priority is attributed to the B-picture, the P-picture and the I-picture, in the order.

Figure 3:
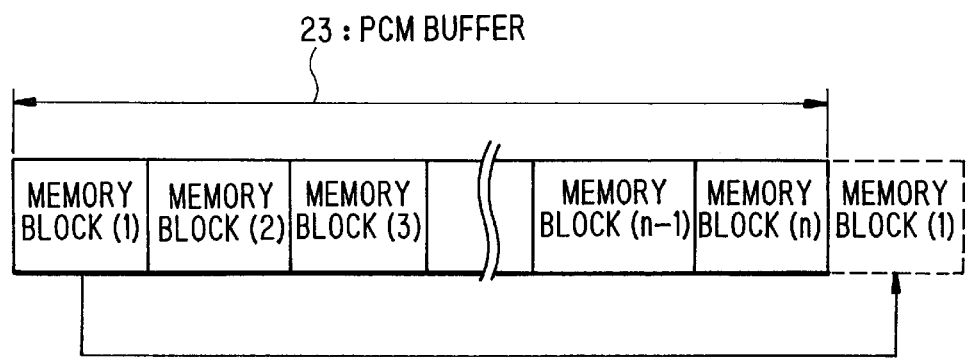
FIG. 3 is a schematic diagram illustrating the PCM buffer 23 of FIG. 1 for storing the data of the audio signal component to be reproduced.

Now, the PCM buffer 23 for storing the data of the audio signal component to be reproduced is described referring to a schematic diagram of FIG. 3.

The PCM buffer 23 operates as a ring buffer comprising a plurality of memory blocks (1) to (n), wherein the data of the audio signal component decompressed by the audio decoder 22 are stored to be read out and supplied to the audio reproduction controller 24 in turns cyclically to be reproduced.

When reproduction by the audio reproduction controller 24 of data read out and transferred from a memory block of the PCM buffer 23 is accomplished, an interruption is occurred and data in next memory block is transferred to the audio reproduction controller 24 to be reproduced. The audio decoder 22 decompresses the audio signal component to be stored in the next memory block which is read out, interrupting processing of the video signal component even when the video signal component is under processing. For example, when reproduction of data of the memory block (1) of FIG. 3 is accomplished, data of the memory block (2) is read out, transferred to the audio reproduction controller 24 and begins to be reproduced. In the memory block (1), data of the audio signal component newly decompressed by the audio decoder 22 is stored to be read out after reproduction of data of the memory block (n) is accomplished.

Thus, the audio signal component is decompressed with the interruption processing prior to other procedure such as the decompression process of the video signal component, in the embodiment. Therefore, the audio signal component can be reproduced without interruption, and accordingly, a precise reproduction time can be obtained from reproduction progress of the audio signal component at the audio reproduction controller 24.

Figure 4:
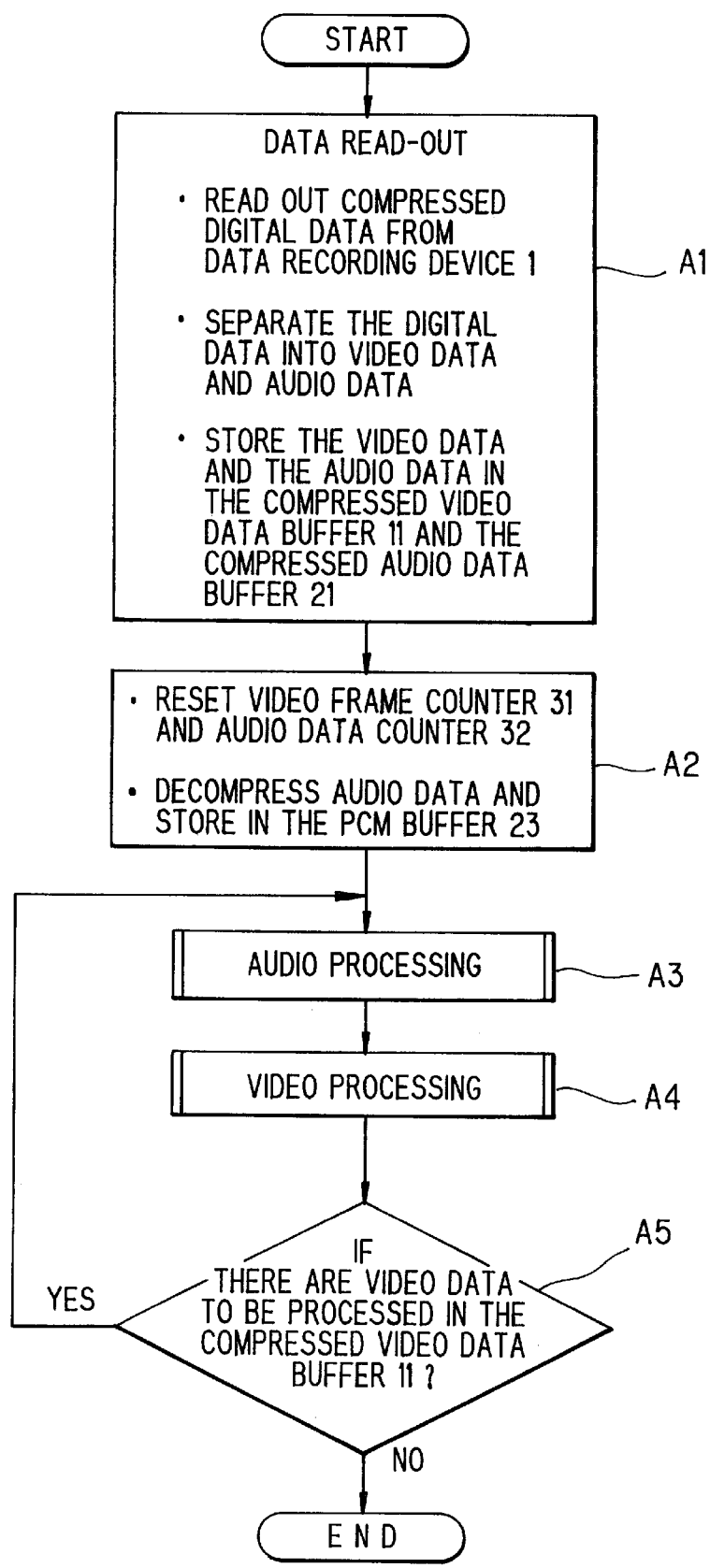
FIG. 4 is a flowchart illustrating main processes of the embodiment of FIG. 1.
Figure 5:
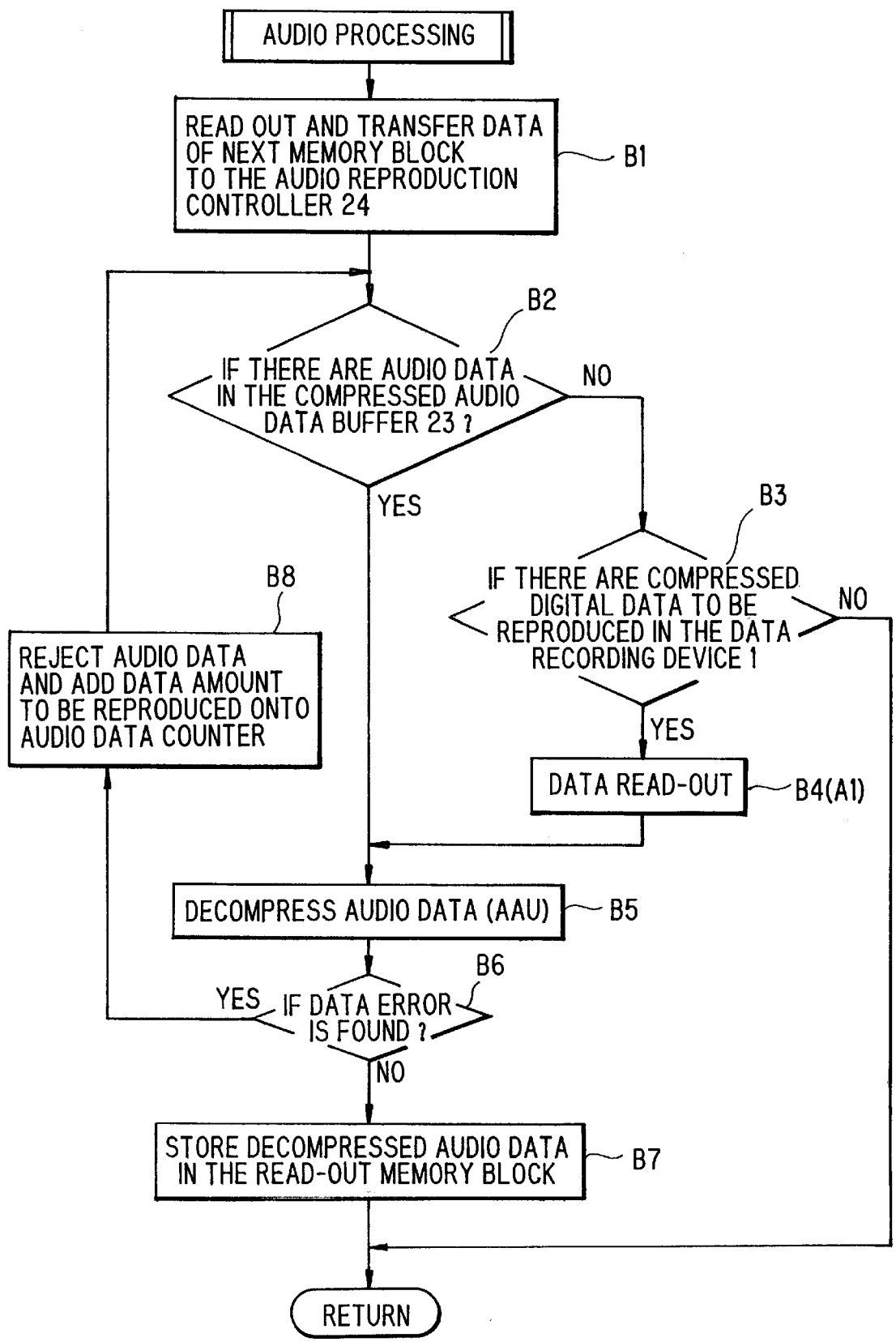
FIG. 5 is a flowchart illustrating details of the audio processing performed by an interruption at step A3 of FIG. 4.
Figure 6:
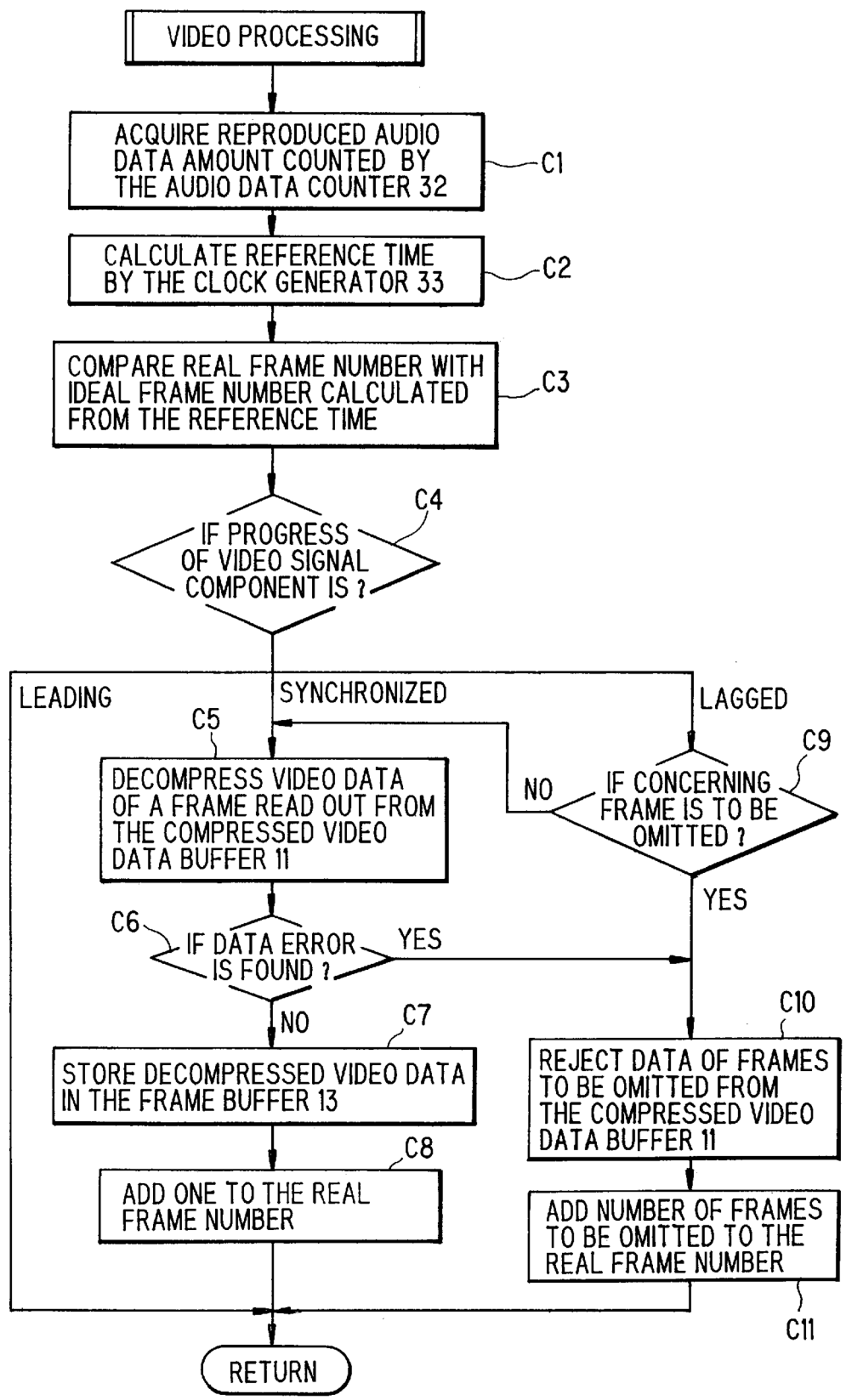
FIG. 6 is a flowchart illustrating details of the video processing performed at step A4 of FIG. 4.

Now, operation of the synchronized playback of AV signals in the embodiment of FIG. 1 is described referring to flowcharts of FIGS. 4 to 6.

FIG. 4 is a flowchart illustrating playback control processes of the embodiment.

As initializing procedure, data read-out (at step A1) and audio data decompression (at step A2) are performed at the beginning of reproduction of AV signals.

At step A1, a block of multiplexed digital data of compressed AV signals is read out from the data recording device 1, and separated into compressed data of the video signal component and those of the audio signal component, which are stored in the compressed video data buffer 11 and the compressed audio data buffer 21, respectively. Then, at step A2, the video frame counter 41 and the audio data counter 43 are reset, and audio data decompression is executed, wherein compressed data of the audio signal component to be prepared in all the memory blocks of the PCM buffer 23 are read out from the compressed audio data buffer 21 and decompressed referring to the audio header information therein.

After the initialization procedure, audio processing (at step A3) and the video processing (at step A4) are repeated until it is detected (at step A5) that there is left no compressed data to be processed in the compressed video data buffer 11. Here, in FIG. 4, the audio processing at step A3 and the video processing at step A4 are depicted to be performed sequentially. However, in the embodiment, the audio processing at step A3 is performed whenever an interruption occurs for the audio data processing, as beforehand described, interrupting the video processing at step A4 even when it is under execution at the time.

FIG. 5 is a flowchart illustrating details of the audio processing performed by an interruption at step A3 of FIG. 4.

When there is no data in the audio reproduction controller 24, an interruption is occurred and data of a first/next memory block in the PCM buffer 23 are read out and transferred to the audio reproduction controller 24 (at step B1), which are converted into analog signals to be supplied to the speaker 7 according to a sampling frequency indicated by the audio header information. Then (at step B5), the compressed data, an AAU, of the audio signal component are read out from the compressed audio data buffer 21, decompressed by the audio decoder 22 and stored (at step B7) in the first/next memory block which is read out, when they are decompressed without problem, on condition that there are compressed data left to be processed in the compressed audio data buffer 21. Then, the audio processing returns, waiting a next interruption. When it is detected (at step B2) that there is no compressed data to be processed in the compressed audio data buffer 21, the data read-out at step B4 is performed in the same way with step A1 described in connection with the initialization procedure of FIG. 4, on condition it is detected (at step B3) that there are compressed digital data of AV signals left to be reproduced in the data recording device 1. When there is detected no compressed digital data of AV signals left to be reproduced in the data recording device 1, only the data read-out and transfer at step B1 is performed for each interruption until data of all the memory blocks in the PCM buffer 23 are transferred to the audio reproduction controller 24.

When there is found an error in the decompression procedure performed by the audio decoder 22 (at step B6), that is, when there is found a bit sequence prohibited or reserved by the audio header information, or when data size of an AAU is different from indication of the header information thereof, data of the AAU are rejected (at step B8) and control returns to step B2 for decompressing a next AAU (at step B5). At the same time at step B8, the audio error detector 44 calculates audio reproduction data size (data size after decompression) of the error AAU referring to the header information thereof, as will be described afterwards, which is added to the reproduction data amount counted by the audio data counter 43. The steps B5, B6, B8 and B2 are repeated until a normal AAU is decoded by the audio decoder 22.

Thus, the audio signal component is reproduced with a priority, in the embodiment.

Now, details of the video processing at step A4 of FIG. 4 is described referring to the flowchart of FIG. 6, wherein the synchronization control and decompression of the video signal component are performed.

First (at step C1), the data amount of the audio signal component actually decompressed and reproduced by the audio reproduction controller 24, or rejected as error data, from the beginning of reproduction is acquired from the audio data counter 43. Then (at step C2), the reference time indicating the reproduction time passage of the audio signal component is calculated by the clock generator 33 from the data amount referring to the audio header information obtained at step A2 of FIG. 4, as follows.

When the audio header information indicates audio data of Layer I, audio bit rate of 192,000 bits/sec, sampling frequency of 44.1 KHz and 2-channel stereo signal, for example, 2 channels of analog signals are generated by the audio reproduction controller 24 from 2×16 bits×441,000/sec of the decompressed data supplied from the PCM buffer 23. Therefore, when the data amount of D bytes is acquired from the audio counter 32, the reference time T is calculated as T(sec)=D×8/(44,100×2×16).

In the data amount of D bytes, there is included an audio recovery data size Dr bytes, that is, a sum of the reproduction data amount of the rejected error data calculated as follows.

$$Dr = (\text{rejected error data [bytes]}) \times \frac{44,100 \times 2 \times 16}{192,000}$$

Thus, the reference time T is calculated according to the data amount D counted by the audio data counter 32 from the reproduction information supplied from the audio reproduction controller 24 and the audio error detector 44, independent of the software timer of the system without needing any special hardware timer, in the embodiment.

By multiplying the reference time T by frame rate of 30 frames/sec, for example, indicated by the video header information, the ideal frame number FI=30T is obtained, which is compared to the real frame number FR (at step C3) by calculating progress PR=FR−FI of the video signal component.

When the progress PR=0, the video signal component is synchronized to the audio signal component, while it is leading when the progress PR. is positive and lagged when the progress PR is negative. However, when the decompression waiting or the frame omission is performed directly according to positive/negative of the progress PR, the control becomes unstable. Therefore, a threshold range is preferably provided for the synchronization discrimination. In the embodiment, when −4<theprogressPR<1, the video signal component is discriminated to be synchronized to the audio signal component (at step C4), considering the fact that the lead of the video signal component gives a sense of more incongruity than the lag thereof.

Returning to FIG. 6, when the ideal frame number FI is 10 and the real frame number FR is 11, for example, the video signal component is discriminated to be leading the audio signal component, the progress PR being one, and control of the video processing returns directly from step C4. The video processing of step A4 of FIG. 4, that is, steps C1 to C4 of FIG. 6 are repeated (including the audio processing of step A3, when there is an interruption) until the progress PR becomes less than one, the ideal frame number becoming more than 11, in the example. Thus, the decompression waiting is performed in the embodiment.

When the ideal frame number FI is 10 and the real frame number is 8, for example, the video signal component is discriminated to be synchronized with the audio signal component, the progress PR being −2. In the case, the control goes to step C5 from step C4. Compressed data of a frame are read out from the compressed video data buffer 11, decompressed by the video decoder 12 and stored in the frame buffer 13 (at step C7) to be displayed on the CRT monitor 6 by the video display controller 14, when no data error is detected (at step C6). Then (at step C8), the real frame number FR is added with one, and the control returns.

When the ideal frame number FI is 10 and the real frame number is 5, for example, the video signal component is discriminated to be lagged from the audio signal component, the progress PR being −5.

In this case, the control goes to step C9, where the omission priority of the concerning frame is checked. In the embodiment, the frame omission is set not to be performed for the I and the P-picture, the control going to step C5 in the case for performing the decompression of the concerning frame. If it is the B-picture, the control goes to step C10 for rejecting data of the concerning frame from the compressed data buffer 11, and the real frame number FR is added with one at step C11 in the same way with step C8.

Here, the frame omission is described to be performed only for B-pictures. However, the frame omission may be set to be performed for the P or I-frames too, by providing a second and a third threshold value according to the omission priority, for example, when the progress PR is lower than the second and the third threshold value. In the case, data of the compressed video data buffer 11 are to be rejected until data of next I-frame at step C10 and the real frame number FR is to be added at step C11 with a number of frames rejected at step C11.

When a data error is detected at step C6 in the decompression procedure performed by the video decoder 12, that is, when there is found a bit sequence prohibited or reserved by the video header information, or when an abnormal slice (sub-region) number or an abnormal macroblock (pixel) number is detected in the decompressed picture data, control goes to step C10, for rejecting the error picture data. When the error picture data are data of a B-picture, the real frame number FR is added with one at step C11. When the error picture data are of a P-picture or an I-picture, data of the compressed video data buffer 11 are rejected until data of next I-frame at step C10 and the real frame number FR is added at step C11 with a number of frames rejected at step C10, in the similar way with the frame omission.

As heretofore described, the synchronization control of the AV signals is performed according to the data amount D counted by the audio data counter 32 from the reproduction information supplied from the audio reproduction controller 24 as well as referring to audio data amount or picture frame number rejected because of data error. Hence, the video signal component can be decompressed and reproduced in synchronization with the audio signal component adequately from the compressed digital data with a simple configuration even when there are found error data in either or both of the audio data and the video data, independent of resolution of the software timer of a system wherein the apparatus of the embodiment is applied, without needing any special hardware timer.

The audio signal component is processed with a priority to be reproduced without any interruption, and even when the frame omission is necessary, it is performed according to priority of frames, enabling a smooth presentation of the video signal component, and eliminating unnecessary frame omission, according to the data processing ability of the system.

What is claimed is:

1. An apparatus for synchronized playback of audio-video signals representing an audio signal component and a video signal component in synchronization with each other by decompressing compressed digital data of the audio signal component and the video signal component, said apparatus comprising:

means for obtaining a reference time indicating a reproduction time passage of the audio signal component from a sum of a reproduced data amount of the audio signal component and an error data amount of said audio signal component rejected because of a data error, based upon header information of the compressed digital data, which includes a sampling rate of the audio signal component and a frame rate of the video signal component; and means for detecting a progress of the video signal component by comparing said reference time to a real frame number of the video signal component, said real frame number indicating a number of processed picture frames and rejected error picture frames.

2. The apparatus for synchronized playback of audio-video signals recited in claim 1, said means for detecting the progress of the video signal component having:

a video frame counter for counting and maintaining said real frame number by accumulating a number of picture frames actually decompressed and a number of picture frames omitted from being decompressed;

a video error detector for adding an error frame number of the video signal component, which corresponds to a number of picture frames rejected without reproduction because of a data error, to said real frame number; and a delay detector for calculating an ideal frame number of the video signal component to be displayed according to said reference time and said frame rate, and detecting said progress of the video signal component by comparing said real frame number to said ideal frame number.

3. The apparatus for synchronized playback of audio-video signals recited in claim 1, further comprising means for restoring a difference in display timing between the video signal component and said reference time by performing frame omission and delaying decompression of the video signal component according to said progress of the video signal component.

4. The apparatus for synchronized playback of audio-video signals recited in claim 3; wherein said frame omission is performed according to an order of priority attributed to frames of the video signal component subject to said frame omission in connection with kinds of compressed data of said frames.

5. The apparatus for synchronized playback of audio-video signals recited in claim 3; wherein said decompression delay is performed by controlling decompression of compressed data of a frame of the video signal component be delayed until said difference of display timing of said frame from said reference time becomes within a threshold value.

6. A method for synchronizing playback of audio-video signals representing an audio signal component and a video signal component in synchronization with each other by decompressing compressed digital data of the audio signal component and the video signal component, comprising:

obtaining a reference time indicating a reproduction time passage of the audio signal component from a sum of a reproduced data amount of the audio signal component and an error data amount of said audio signal component rejected because of a data error, based upon header information of the compressed digital data, which includes a sampling rate of the audio signal component and a frame rate of the video signal component; and detecting a progress of the video signal component by comparing said reference time to a real frame number of the video signal component, said real frame number indicating a number of processed picture frames and rejected error picture frames.

\* \* \* \* \*